(12) United States Patent
Nakada et al.

(10) Patent No.: US 8,151,809 B2
(45) Date of Patent: Apr. 10, 2012

(54) CLEANING APPARATUS FOR VEHICLE LAMP

(75) Inventors: Katsumi Nakada, Shizuoka (JP); Hiromasa Takada, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 632 days.

(21) Appl. No.: 12/209,024

(22) Filed: Sep. 11, 2008

(65) Prior Publication Data

US 2009/0084418 A1    Apr. 2, 2009

(30) Foreign Application Priority Data

Oct. 1, 2007    (JP) .................................. 2007-257662

(51) Int. Cl.
*B08B 3/00*    (2006.01)
(52) U.S. Cl. .................. 134/123; 49/381; 296/146.1
(58) Field of Classification Search .................. 134/123; 239/284.2

See application file for complete search history.

(56) References Cited

U.S. PATENT DOCUMENTS

2006/0048453 A1* 3/2006 Bourennane ..................... 49/381
2006/0273139 A1* 12/2006 Sakai et al. ..................... 228/101

FOREIGN PATENT DOCUMENTS

| DE | 199 38 992 | | 2/2001 |
| DE | 19954413 | * | 5/2001 |
| FR | 2 749 553 | | 12/1997 |
| JP | 2006-335273 A | | 12/2006 |

OTHER PUBLICATIONS

Machine translation of DE19954413 (May 2001).*
Patent Abstracts of Japan, Publication No. 2006-335273, Publication Date: Dec. 14, 2006, 1 page.
EP Communication issued in related patent application No. 08164440.3, dated Oct. 25, 2010, 6 pages.

* cited by examiner

*Primary Examiner* — Michael Barr
*Assistant Examiner* — Jason Ko
(74) *Attorney, Agent, or Firm* — Osha • Liang LLP

(57) ABSTRACT

A nozzle portion having jet nozzles for jetting a cleaning liquid, a nozzle cover covering the nozzle portion from a front side, a piston connected to the nozzle portion, and moved integrally with the nozzle portion and the nozzle cover in a movement direction, and a cylinder movably supporting the piston are provided. A bracket which includes arms located in abutment with or in proximity with a rear surface of the nozzle cover and regulates an inclination of the nozzle cover with respect to the movement direction is provided.

2 Claims, 6 Drawing Sheets

CLEANING APPARATUS FOR VEHICLE LAMP

This application claims foreign priority from Japanese Patent Application No. 2007-257662 filed on Oct. 1, 2007, the entire contents of which are hereby incorporated by reference.

BACKGROUND OF THE INVENTION

1. Field of the Invention

The present invention relates to a cleaning apparatus of a vehicle lamp. Specifically, the present invention relates to the cleaning apparatus in which a nozzle cover is prevented from unfastening from a nozzle portion.

2. Background Art

There is a cleaning apparatus which is movable to protrude from and retract into an opening formed in a vehicle body or a bumper, and cleans a front cover of a vehicle head lamp.

Such a cleaning apparatus (for example, refer to JP-A-2006-335273) includes: a nozzle portion having jet nozzles for jetting a cleaning liquid; a nozzle cover for covering the nozzle portion from a front side; a piston connected to the nozzle portion; and a cylinder movably supporting the piston. An opening formed in a vehicle body or a bumper is closed by the nozzle cover at the time when the cleaning apparatus is housed. The nozzle portion and a part of the piston protrude forward from the opening, and a cleaning liquid is jetted from the jet nozzles to clean the front cover at the time of cleaning.

In the cleaning apparatus, at the time when the cleaning apparatus is housed, in order to ensure the design property of a vehicle, and prevent entering of moisture, dust, etc. via the opening from the outside, an outer peripheral portion of the nozzle cover is brought into close contact with a peripheral edge of the opening, or covers the opening.

Meanwhile, the cleaning apparatus is often used in a cold region, etc. in order to melt snow or ice adhered to a front cover of the head lamp to secure a good field of view. Accordingly, depending on weather conditions when the cleaning apparatus is used, the outer peripheral portion of the nozzle cover may be frozen. If a part of nozzle cover sticks to the peripheral edge of the opening due to the freezing, and when the nozzle portion tends to move forward along with the piston, a force in a direction in which the nozzle cover is inclined with respect to the movement direction may be given to the nozzle cover.

However, in the cleaning apparatus of a vehicle lamp described in JP-A-2006-335273, a front end of the nozzle portion is connected to only a middle portion of the nozzle cover. Therefore, when the force in the above inclined direction is given, the nozzle cover is inclined with respect to the nozzle portion with a connecting portion between the nozzle portion and the nozzle cover as a fulcrum. As a result, there is a possibility that the nozzle cover may be unfastened from the nozzle portion, or the connecting portion between the nozzle cover and the nozzle portion may be damaged.

SUMMARY OF THE INVENTION

One or more embodiments of the invention provide a cleaning apparatus for vehicle lamp in which unfastening or the like of a nozzle cover from a nozzle portion is prevented.

In accordance with one ore more embodiments of the invention, a cleaning apparatus for a vehicle lamp is provided with: a nozzle portion having a jet nozzle for jetting a cleaning liquid; a nozzle cover for covering the nozzle portion from a front side; a piston connected to the nozzle portion and integrally movable with the nozzle portion and the nozzle cover in a movement direction; a cylinder movably supporting the piston; and a bracket that includes an arm portion located in abutment with or in proximity with a rear surface of the nozzle cover, and regulates an inclination of the nozzle cover with respect to the movement direction.

Accordingly, in the cleaning apparatus, the nozzle cover is supported by the arm portion of the bracket from the rear side.

Even when the force in the direction in which the nozzle cover is inclined with respect to the movement direction is applied to the nozzle cover, the nozzle cover moves to the movement direction without being inclined, and an unfastening or a damaging of the nozzle cover can be prevented.

Further, the nozzle cover may have a shape which is long in one direction, and the arm portion may include a pair of arms which are spaced apart from each other in a longitudinal direction of the nozzle cover. Thereby, the inclination of the nozzle cover particularly in the direction in which the nozzle cover tends to be inclined with respect to the movement direction can be prevented.

Further, the cleaning apparatus may include a holder provided between the nozzle cover and the nozzle portion for connecting the nozzle cover and the nozzle portion and integrally movable with the piston in the movement direction, and a leg portion that is provided in the bracket and regulates an inclination of the holder with respect to the movement direction. Thereby, the unfastening of the holder from the nozzle portion or the damage thereof can be prevented.

Moreover, the cleaning apparatus may include: a cylindrical portion that is provided in the nozzle portion, extends in a direction orthogonal to the movement direction, and supports the jet nozzles; a plate portion that is provided on the holder and extends in the direction orthogonal to the movement direction, and a cylindrical portion holding portion and a plate portion holding portion that are provided in the bracket and pinch the cylindrical portion and the plate portion therebetween. Thereby, the unfastening of the holder from the nozzle portion can be prevented, and the bracket can be easily and firmly attached to the holder and the nozzle portion.

Other aspects and advantages of the invention will be apparent from the following description, the drawings and the claims.

DETAILED DESCRIPTION OF THE EXEMPLARY EMBODIMENTS

Hereinafter, an exemplary embodiment of a cleaning apparatus for a vehicle lamp of the invention will be described with reference to the accompanying drawings.

Figure 1:
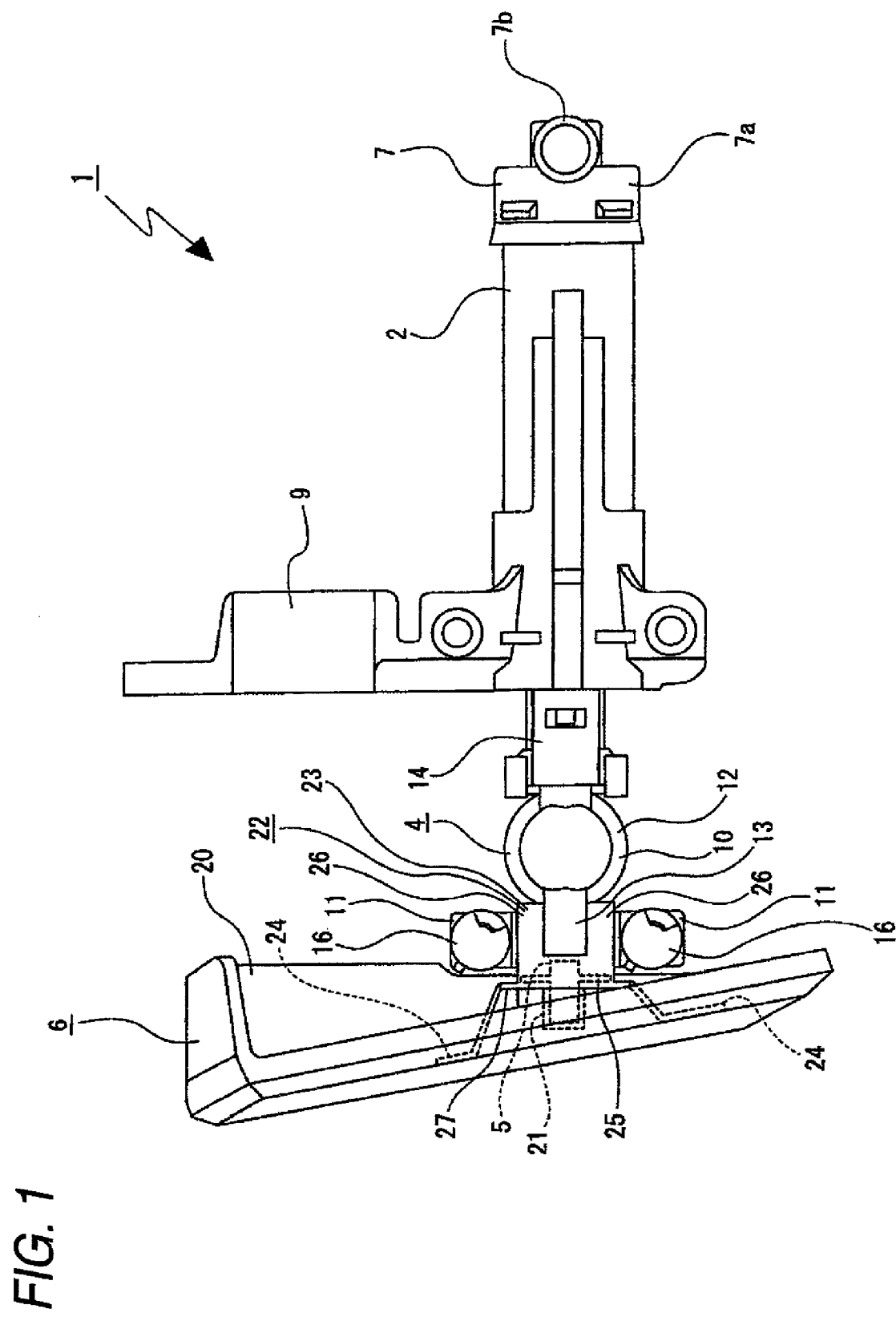
FIG. 1 shows a plan view of a cleaning apparatus according to an exemplary embodiment of the invention.
Figure 2:
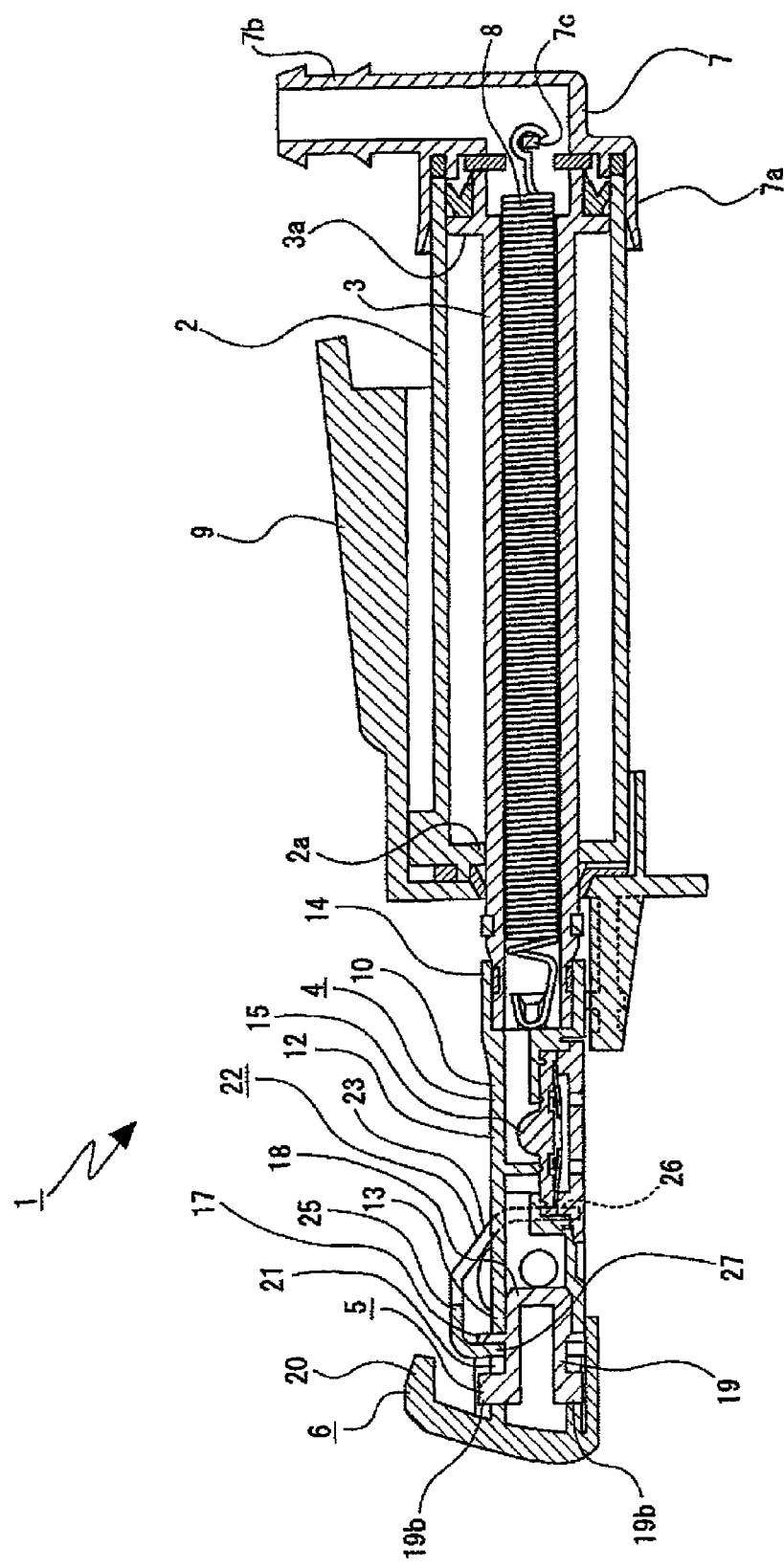
FIG. 2 is a sectional view of the cleaning apparatus.

A cleaning apparatus 1, as shown in FIG. 1 and FIG. 2, includes a cylinder 2, a piston 3 slidably supported by the cylinder 2, a nozzle portion 4 connected to a front end of the piston 3, a holder 5 connected to a front end of the nozzle portion 4, and a nozzle cover 6 connected to the front end of the holder 5.

The cylinder 2 is formed in a substantially cylindrical shape, and has an inwardly overhung inner flange portion 2a at its front end (refer to FIG. 2).

A joint 7 is attached to a rear end of the cylinder 2 (refer to FIG. 1 and FIG. 2). The joint 7 has a cover portion 7a which blocks the rear end of the cylinder 2, and a connecting tube portion 7b continuous with the rear surface of the cover portion 7a. A spring hooking portion 7c is provided inside the cover portion 7a of the joint 7.

In a state where the joint 7 is attached to the rear end of the cylinder 2, the inside of the cover portion 7a communicates with the inside of the piston 3 (refer to FIG. 2).

One end of a cleaning liquid supplying tube (not shown) is connected to the connecting tube 7b of the joint 7, and the other end of the cleaning liquid supplying tube is connected to a cleaning liquid tank (not shown). Therefore, the cleaning liquid is supplied to the inside of the piston 3 via the cleaning liquid supplying tube and the joint 7 from the cleaning liquid tank.

The cylinder 3 is formed in a substantially cylindrical shape, and has an outwardly overhung outer flange portion 3a provided at its rear end. During the movement of the piston 3 with respect to the cylinder 2, the outer flange portion 3a of the piston is slid on an inner peripheral surface of the cylinder 2, and an outer peripheral surface of the piston is slid on the inner flange portion 2a of the cylinder 2.

A spring hooking projection 3b is provided inside the piston at the front end of the piston 3. A tension coil spring 8 is supported between the spring hooking projection 3b of the piston 3, and the spring hooking portion 7c of the joint 7. Therefore, the piston 3 is urged rearward by the tension coil spring 8.

An attached body 9 is attached to the cylinder 2, and as the attached body 9 is attached to a vehicle body or a bumper, the cleaning apparatus 1 is arranged inside a vehicle.

Figure 3:
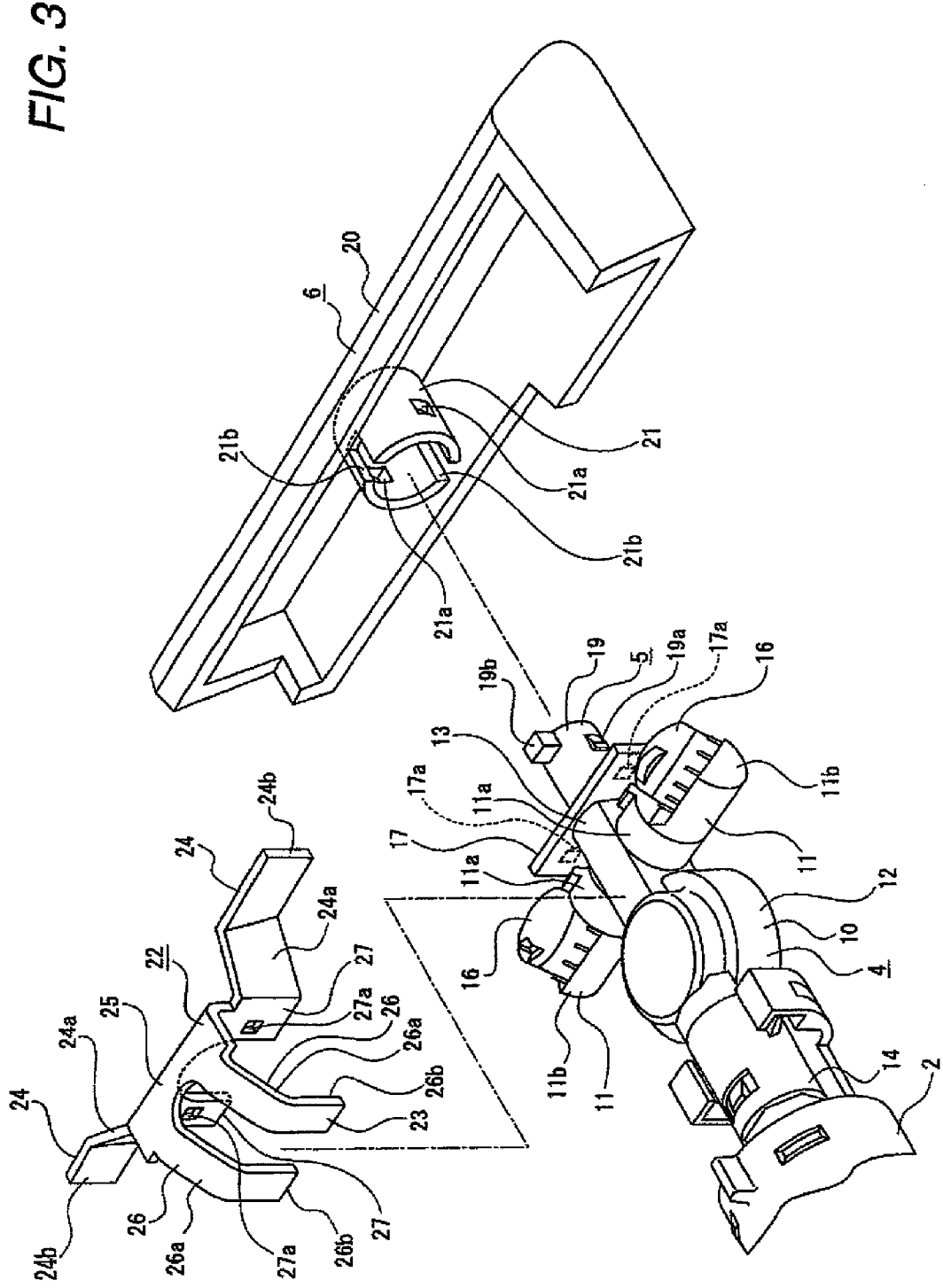
FIG. 3 is an enlarged exploded perspective view showing a portion of the cleaning apparatus.
Figure 4:
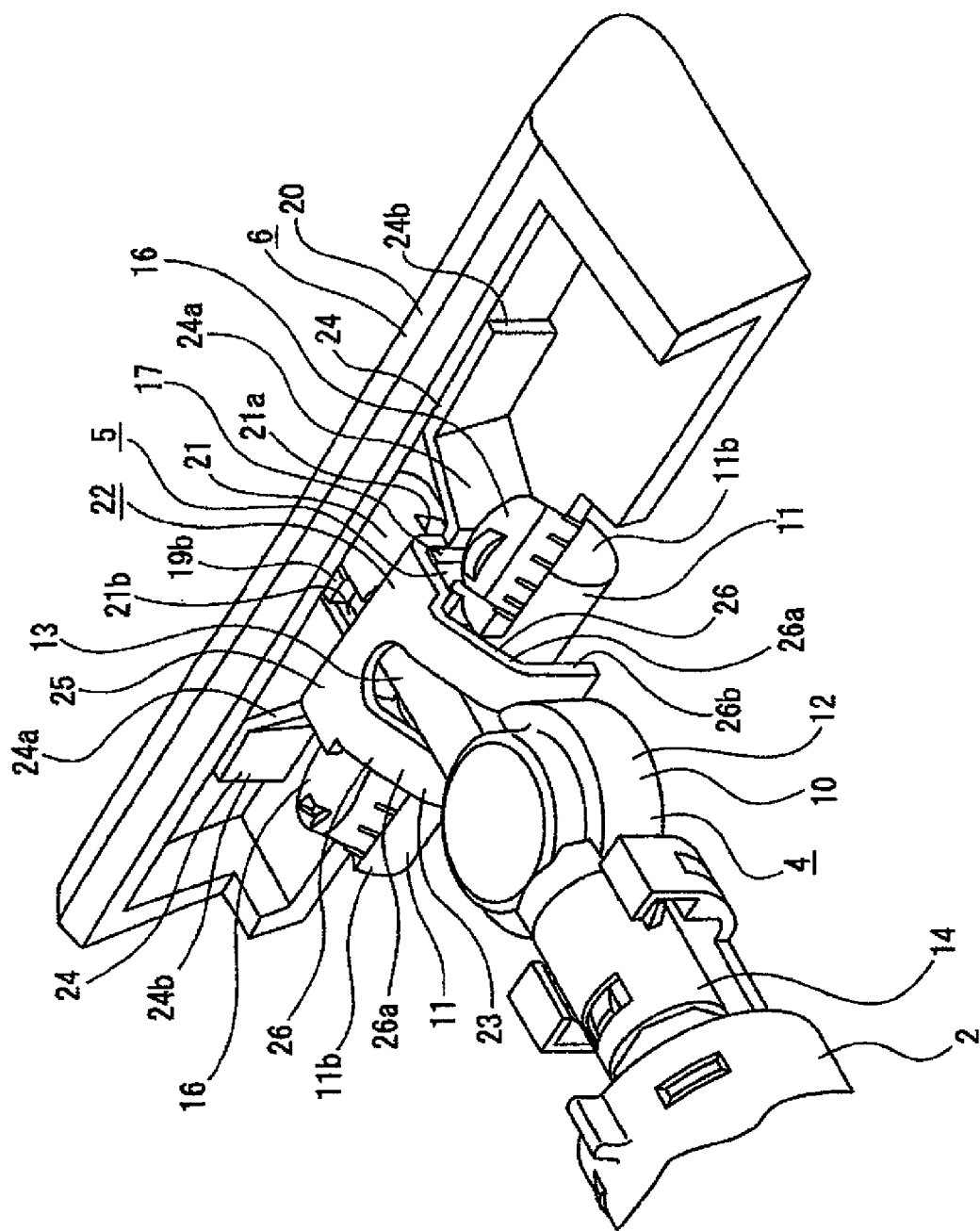
FIG. 4 is an enlarged perspective view showing a portion of the cleaning apparatus.

The nozzle portion 4 is connected to the front end of the piston 3 (refer to FIG. 1 to FIG. 4). As shown in FIG. 3 and FIG. 4, the nozzle portion 4 has a valve arrangement portion 10 which is long back and forth, and cylindrical portions 11 and 11 which are long to the right and left. The cylindrical portions 11 and 11 are supported so as to be rotatable around an axis, which extends to the right and left in a position in the vicinity of the front end of the valve arrangement portion 10, as a fulcrum.

The valve arrangement portion 10 is composed of a valve holding portion 12, a holder connecting portion 13 protruding forward from the valve holding portion 12, and a piston connecting portion 14 protruding rearward from the valve holding portion 12.

A check valve 15 is held inside the valve holding portion 12 (refer to FIG. 2). The check valve 15 is opened and closed according to the intensity of the hydraulic pressure of a cleaning liquid supplied to the inside of the nozzle portion 4, and has a function to control the supply of the cleaning liquid to the front, and the stop of supply thereof.

As for the valve arrangement portion 10, the piston connecting portion 14 is connected to the front end of the piston 3.

The cylindrical portions 11 and 11 are rotatably supported by the holder connecting portion 13. As shown in FIG. 3 and FIG. 4, the cylindrical portions 11 and 11 has cylindrical portions 11a and 11a located in a state where they touch the right and left of the holder connecting portion 13, and nozzle supporting portions 11b and 11b which are respectively continuous with the outsides of the cylindrical portions 11a and 11a. Jet nozzles 16 and 16 are supported by the nozzle supporting portions 11b and 11b, respectively, so as to be rotatable around an axis, which extends up and down, as a fulcrum.

In the cleaning apparatus 1, the jet direction of a cleaning liquid jetted from the jet nozzles 16 and 16 can be adjusted in a desired direction by rotating the cylindrical portions 11 and 11 around an axis, which extends to the right and left with respect to the valve arrangement portion 10, as a fulcrum, and by rotating the jet nozzles 16 and 16 around an axis, which extends in the up-down direction with respect to the cylindrical portions 11 and 11, as a fulcrum.

The holder 5 is connected to the front end of the holder connecting portion 13 in the nozzle portion 4.

The holder 5 is obtained by integrally forming a plate portion 17 formed in the shape of a plate which is directed back and forth, a rear connecting portion 18 protruding rearward from a central portion of the plate portion 17, and a front connecting portion 19 protruding forward from the central portion of the plate portion 17.

Locking claws 17a and 17a are provided on the front surface of the plate portion 17 which are spaced apart from each other to the right and left. The locking claws 17a and 17a are formed such that, as the claws go downward, the protruding amount thereof to the front becomes large.

An outer peripheral surface of the front connecting portion 19 is provided with engaging protrusions 19a and 19a which are spaced apart from each other in the peripheral direction, and protrude outward. Both upper and lower end surfaces of an outer peripheral surface of the front connecting portion 19 are respectively provided with positioning protrusions 19b and 19b which protrude up and down.

As for the holder 5, the rear connecting portion 18 is connected to the holder connecting portion 13 of the nozzle portion 4 by, for example, press fitting, and, the plate portion 17 touches the front end of the holder connecting portion 13.

The nozzle cover 6 is connected to the front connecting portion 19 of the holder 5. The nozzle cover 6 is obtained by integrally forming a cover portion 20 which is formed long in the right-left direction, and a connecting cylindrical portion 21 which protrudes from the back of the cover portion 20. The connecting cylindrical portion 21 is formed in a cylindrical shape which is opened rearward, and has engagement holes 21a and 21a which pass therethrough to the right and left, and positioning slits 21b and 21b which are opened forward.

The nozzle cover 6 is connected to the holder 5 as the positioning protrusions 19b and 19b of the front connecting portion 19 are respectively inserted into and positioned in the positioning slits 21b and 21b of the connecting cylindrical portion 21, and the engaging protrusions 19a and 19a of the front connecting portion 19 are respectively engaged with the engagement holes 21a and 21a of the connecting cylindrical portion 21.

A bracket 22 is attached to the nozzle portion 4 and the holder 5. The bracket 22 is formed, for example, by bending a plate-like metallic material into a predetermined shape, and is constituted by a leg portion 23 and an arm portion 24.

The leg portion 23 is composed of a base portion 25 which is oriented in the up-down direction, cylindrical portion holding portions 26 and 26 which protrude from a rear edge of the base portion 25, and plate portion holding portions 27 and 27 which protrude from a front edge of the base portion 25.

The cylindrical portion holding portions 26 and 26 are located so as to be spaced apart from each other to the right and left, and are composed of the inclined portions 26a and 26a which protrude obliquely downward and rearward from the rear edge of the base portion 25, and pinching portions 26b and 26b which protrude downward from lower ends of the inclined portions 26a and 26a.

The plate portion holding portions 27 and 27 are located so as to be spaced apart from each other to the right and left, and protrude downward from the front edge of the base portion 25. Locking holes 27a and 27a are formed in the plate portion holding portions 27 and 27, respectively.

The arm portion 24 is composed of protruding portions 24a and 24a which protrude substantially forward from outer edges, respectively, of the plate portion holding portions 27 and 27, and holding portion 24b and 24b which protrude sideways (outward) from outer edges, respectively, of the protruding portions 24a and 24a, and the holding portions 24b and 24b are provided so as to be directed back and forth.

The bracket 22 is attached to the holder 5 and the nozzle portion 4 in a state where the plate portion holding portions 27 and 27 have touched the front surface of the plate portion 17 of the holder 5 and the pinching portions 26b and 26b of the cylindrical portion holding portions 26 and 26 have touched the rear surfaces of the cylindrical portions 11 and 11 of the nozzle portion 4 (refer to FIG. 4). At this time, locking claws 17a and 17a of the plate portion 17 are locked to opening edges, respectively, of the locking holes 27a and 27a of the plate portion holding portions 27 and 27, and thereby, unfastening of the bracket 22 from the holder 5 is prevented.

In a state where the bracket 22 is attached to the holder 5 and the nozzle portion 4, the plate portion holding portions 27 and 27 and the cylindrical portion holding portions 26 and 26 are gradually displaced in the directions in which they go away from each other. Accordingly, in the bracket 22, the leg portion 23 pinches the plate portion 17 and the cylindrical portions 11 and 11 while holding an elastic force in directions in which both approach each other.

In a state where the bracket 22 is attached to the holder 5 and the nozzle portion 4, the holding portions 24b and 24b of the arm portion 24 of a bracket 22 are brought into abutment with or brought close to the back surface of the cover portion 20 of the nozzle cover 6.

Figure 5:
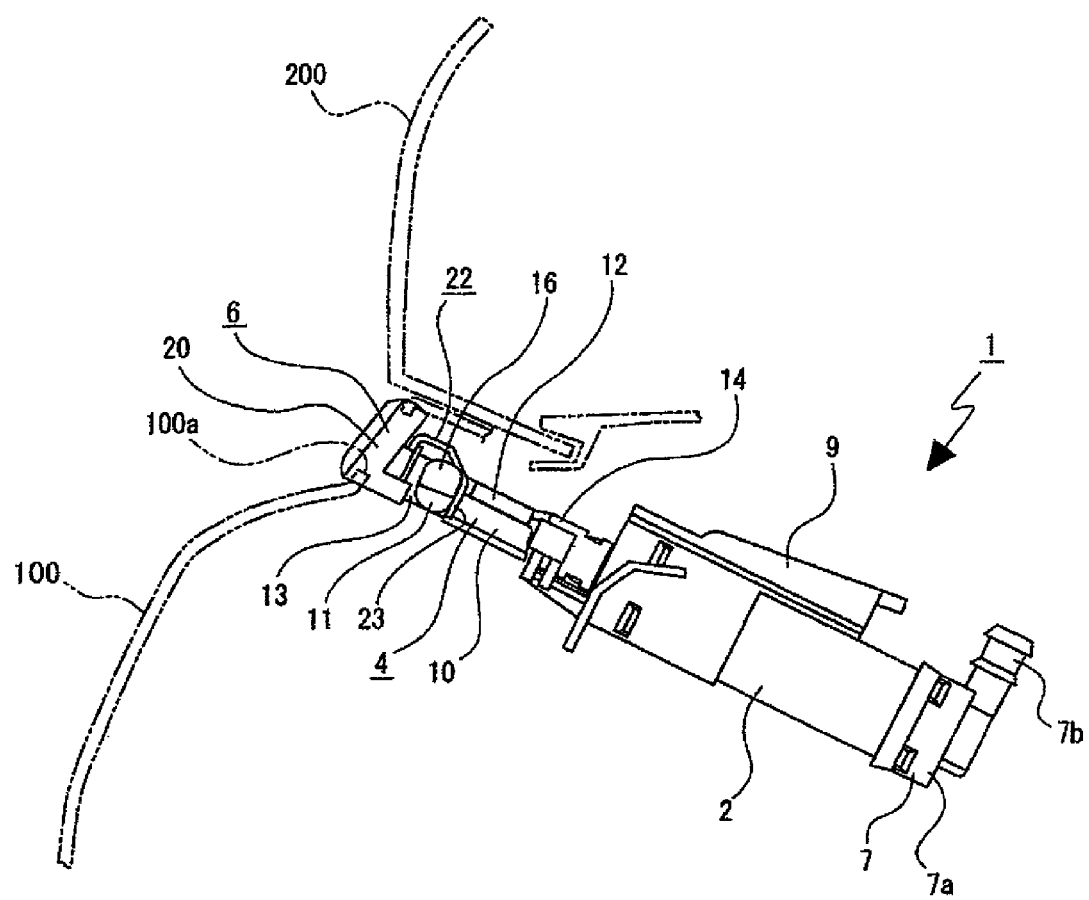
FIG. 5 is a side view showing a housed state.

In a housed state where the cleaning apparatus 1 constructed as mentioned above is housed inside the vehicle body, the piston 3 is urged rearward by the urging force of the tension coil spring 8, and thereby an outer peripheral portion of the nozzle cover 6 is brought into close contact with a peripheral edge of an opening 100a formed in a vehicle body or a bumper 100, or covers the opening 100a (refer to FIG. 5).

In the housed state, when a cleaning liquid is supplied to the inside of the piston 3 via a cleaning liquid supplying tube, and the joint 7 from the cleaning liquid tank, the cleaning liquid arrives at the inside of the nozzle portion 4 through the inside of the piston 3. Since the check valve 15 is blocked at this time, the cleaning liquid does not flow into the front from the check valve 15.

Figure 6:
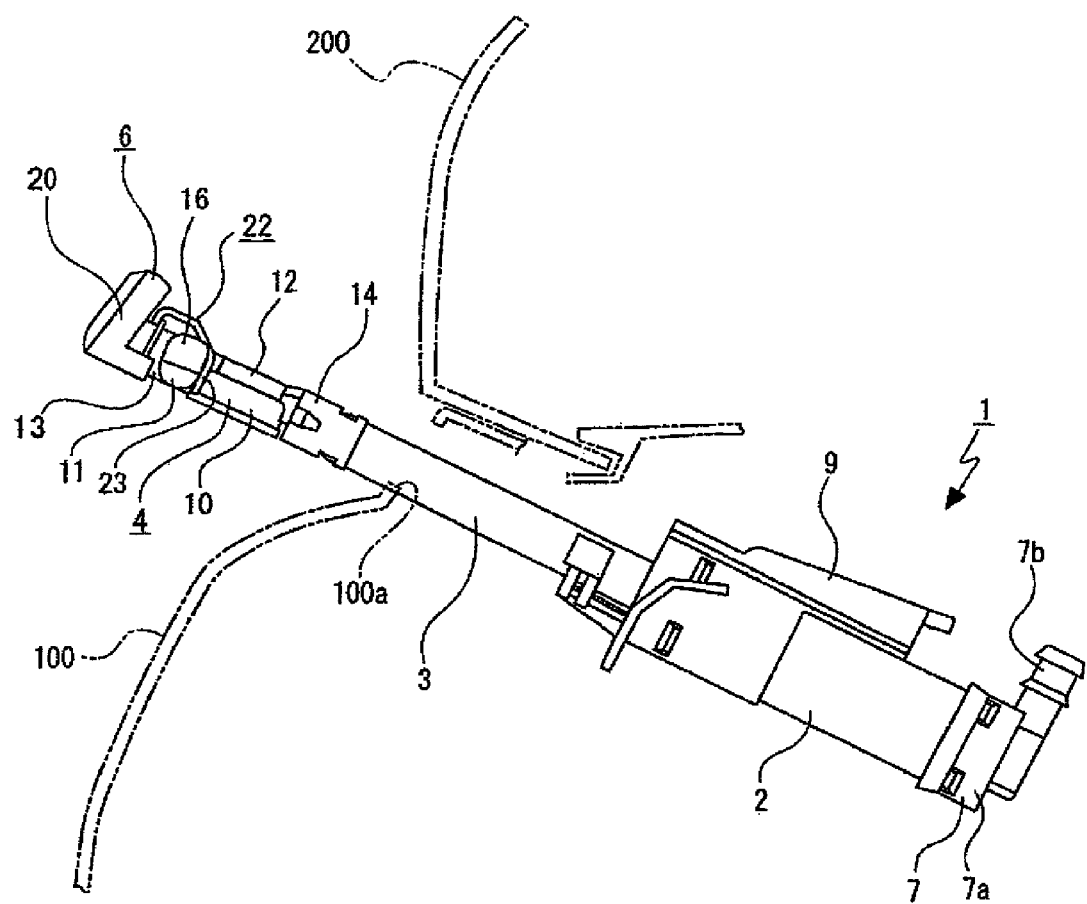
FIG. 6 is a side view showing a state where a cleaning liquid is jetted.

When the cleaning liquid arrives at the inside of the nozzle portion 4, internal pressure rises by the supplied cleaning liquid, the tension coil spring 8 is extended, and the piston 3 protrude forward from the cylinder 2. With the movement of the piston 3 to the front, the nozzle cover 6, the holder 5, and the nozzle portion 4 are moved to the front (refer to FIG. 6).

At this time, for example, in a cold region, etc., in a case where a portion of an outer peripheral portion of the nozzle cover 6 has frozen, the portion of the outer peripheral portion sticks to a portion of a peripheral edge of the opening 100a. Thus, when the nozzle cover 6 tends to move forward, the force in the direction in which the nozzle cover 6 is inclined with respect to the movement direction (to the front) with a connecting portion with the holder 5 as a fulcrum is given.

However, since the cover portion 20 of the nozzle cover 6 is supported by the holding portions 24b and 24b of the arms 24 and 24 of the bracket 22 from behind, the inclination of the nozzle cover 6 is regulated, and the nozzle cover 6 is moved forward without being inclined.

When the outer flange portion 3a of the piston 3 touches the inner flange portion 2a of the cylinder 2, the protrusion of the piston 3 from the cylinder 2 is stopped. When the movement of the piston 3 to the front is stopped, the internal pressure rises further by the cleaning liquid to be further supplied, and the check valve 15 is opened. Thereby, a cleaning liquid flows into the front from the check valve 15, and the cleaning liquid is jetted toward a front cover 200 of a vehicle head lamp from the jet nozzles 16 and 16, thereby cleaning the front cover 200.

When the supply of the cleaning liquid from the cleaning liquid tank is stopped, the internal pressure falls, the check valve 15 is blocked, and the jetting of the cleaning liquid from the jet nozzles 16 and 16 is stopped.

When the internal pressure falls further, the piston 3, the nozzle cover 6, the holder 5, and the nozzle portion 4 are moved rearward by the urging force of the tension coil spring 8, and are housed again. In the housed state, the outer peripheral portion of the nozzle cover 6 is brought into close contact with the peripheral edge of the opening 100a formed in a vehicle body or the bumper 100, or covers the opening 100a.

As described, in the cleaning apparatus 1, the bracket 22 which regulates the inclination of the nozzle cover 6 to the movement direction is provided. Therefore, for example, in a cold region, etc., even when a portion of the outer peripheral portion of the nozzle cover 6 has frozen, and the force in the direction in which the nozzle cover 6 is inclined with respect to the movement direction with a connecting portion with the holder 5 as a fulcrum is given, the nozzle cover 6 is moved forward without being inclined, and unfastening or damage of the nozzle cover 6 can be prevented.

Further, in the cleaning apparatus 1, the arm portion 24 and 24 of the bracket 22 are provided so as to be spaced apart from each other in the longitudinal direction (right-left direction) of the nozzle cover 6. Therefore, the inclination of the nozzle cover 6 particularly in the direction in which the nozzle cover 6 tends to be inclined with respect to the movement direction can be prevented.

In addition, since the front surface of the holding portions 24b and 24b in the arms 24 and 24 of the bracket 22 has fixed area, not only the inclination of the nozzle cover 6 in the longitudinal direction, but the inclination of the nozzle cover 6 in other directions, for example, in the up-down direction can be prevented.

Further, although the example where two holding portions 24b and 24b are provided in the bracket 22 has been shown above, the number of the holding portions 24b is arbitrary. For example, only one holding portion may be provided in a position corresponding to a direction to be assumed that inclination is apt to occur. Further, a plurality of three or more holding portions 24b, . . . , and 24b can be provided.

Moreover, in the cleaning apparatus 1, the bracket 22 is provided with the leg portion 23 to be attached to the holder 5 and the nozzle portion 4. Therefore, the inclination of the holder 5 with respect to the movement direction is regulated by the leg portion 23, and unfastening of the holder 5 from the nozzle portion 4 or damage thereof can be prevented.

In addition, in the cleaning apparatus 1, the nozzle portion 4 is provided with the cylindrical portions 11 and 11 extending to the right and left, the holder 5 is provided with the plate portion 17 extending to the right and left, and the bracket 22 pinches the cylindrical portions 11 and 11 and the plate portion 17 while holding an elastic force in directions in which both approach each other. Therefore, unfastening of the holder 5 from the nozzle portion 4 can be prevented, and the bracket 22 can be easily and firmly attached to the holder 5 and the nozzle portion 4.

The shapes and structures of the respective portions shown in the aforementioned exemplary embodiment are merely examples of embodiments to be performed when the invention is carried out. It will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS AND SIGNS

1: CLEANING APPARATUS
2: CYLINDER
3: PISTON
4: NOZZLE PORTION
5: HOLDER
6: NOZZLE COVER
11: CYLINDRICAL PORTION
16: JET NOZZLE
17: PLATE PORTION
22: BRACKET
23: LEG PORTION
24: ARM PORTION
26: CYLINDRICAL PORTION HOLDING PORTION
27: PLATE PORTION HOLDING PORTION
100: BUMPER
100*a*: OPENING

What is claimed is:

1. A cleaning apparatus for a vehicle lamp comprising:
a nozzle portion having a jet nozzle for jetting a cleaning liquid;
a nozzle cover for covering the nozzle portion from a front side;
a piston connected to the nozzle portion and integrally movable with the nozzle portion and the nozzle cover in a movement direction;
a cylinder movably supporting the piston;
a bracket that includes an arm portion located in abutment with or in proximity with a rear surface of the nozzle cover, and regulates an inclination of the nozzle cover with respect to the movement direction;
a holder provided between the nozzle cover and the nozzle portion for connecting the nozzle cover and the nozzle portion and integrally movable with the piston in the movement direction;
a leg portion that is provided in the bracket and regulates an inclination of the holder with respect to the movement direction;
a cylindrical portion that is provided in the nozzle portion, extends in a direction orthogonal to the movement direction, and supports the jet nozzle;
a plate portion that is provided on the holder and extends in the direction orthogonal to the movement direction; and
a cylindrical portion holding portion and a plate portion holding portion that are provided in the bracket and pinch the cylindrical portion and the plate portion therebetween.

2. The cleaning apparatus according to claim 1, wherein the nozzle cover has a shape which is long in one direction, and wherein the arm portion includes a pair of arms which are spaced apart from each other in a longitudinal direction of the nozzle cover.

* * * * *